(12) United States Patent
Hayashi et al.

(10) Patent No.: US 9,281,096 B2
(45) Date of Patent: Mar. 8, 2016

(54) ANISOTROPIC CONDUCTIVE MATERIAL AND PROCESS FOR PRODUCTION THEREOF, AND MOUNTING BODY AND PROCESS FOR PRODUCTION THEREOF

(75) Inventors: Shinichi Hayashi, Tochigi (JP); Hiroshi Hamachi, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 554 days.

(21) Appl. No.: 13/806,506

(22) PCT Filed: Jun. 21, 2011

(86) PCT No.: PCT/JP2011/064159
§ 371 (c)(1),
(2), (4) Date: Feb. 8, 2013

(87) PCT Pub. No.: WO2011/162256
PCT Pub. Date: Dec. 29, 2011

(65) Prior Publication Data
US 2013/0140085 A1     Jun. 6, 2013

(30) Foreign Application Priority Data

Jun. 21, 2010  (JP) .................................. 2010-140502

(51) Int. Cl.
| | |
|---|---|
| C09J 9/02 | (2006.01) |
| H01B 1/20 | (2006.01) |
| C08L 23/08 | (2006.01) |
| C08L 71/00 | (2006.01) |
| C09D 167/00 | (2006.01) |
| C09J 129/14 | (2006.01) |
| H01B 1/22 | (2006.01) |
| H01R 4/04 | (2006.01) |
| C09J 123/08 | (2006.01) |
| C08K 5/14 | (2006.01) |
| C08L 63/10 | (2006.01) |
| C08L 67/07 | (2006.01) |
| C08L 75/16 | (2006.01) |
| C08L 79/08 | (2006.01) |

(52) U.S. Cl.
CPC .............. *H01B 1/20* (2013.01); *C08L 23/0853* (2013.01); *C08L 71/00* (2013.01); *C09D 167/00* (2013.01); *C09J 9/02* (2013.01); *C09J 123/0853* (2013.01); *C09J 129/14* (2013.01); *H01B 1/22* (2013.01); *H01R 4/04* (2013.01); *C08G 2650/56* (2013.01); *C08K 5/14* (2013.01); *C08L 63/10* (2013.01); *C08L 67/07* (2013.01); *C08L 75/16* (2013.01); *C08L 79/08* (2013.01); *C08L 2205/03* (2013.01)

(58) Field of Classification Search
CPC ... C09J 9/02; C09J 123/0853; C08L 23/0853; H01B 1/22; H01R 4/04
USPC ................... 156/334; 252/500, 512, 513, 514; 524/440, 502, 515, 523, 524
See application file for complete search history.

(56) References Cited

U.S. PATENT DOCUMENTS

2005/0233161 A1*  10/2005  Takeda ...................... C09J 9/02
                                                          428/500

FOREIGN PATENT DOCUMENTS

| JP | 10-273633 | * 10/1998 |
|---|---|---|
| JP | A-10-273633 | 10/1998 |
| JP | A-2002-203427 | 7/2002 |
| JP | A-2003-292908 | 10/2003 |
| JP | A-2008-111092 | 5/2008 |

OTHER PUBLICATIONS

Jan. 15, 2013 International Preliminary Report on Patentability issued in International Application No. PCT/JP2011/064159 (with translation).
Aug. 16, 2011 International Search Report issued in International Application No. PCT/JP2011/064159 (with translation).

* cited by examiner

*Primary Examiner* — Edward Cain
(74) *Attorney, Agent, or Firm* — Oliff PLC

(57) ABSTRACT

A process margin is improved and high connection reliability is obtained. Disclosed is an anisotropic conductive material including an adhesive composite and conductive particles dispersed in the adhesive composite, the adhesive composite containing a film forming resin, an ethylene vinyl acetate copolymer, a radical polymerizable resin, and a radical polymerization initiator, wherein the ethylene vinyl acetate copolymer to be used has a melt flow rate of not less than 400 g/10 min.

9 Claims, No Drawings

ANISOTROPIC CONDUCTIVE MATERIAL AND PROCESS FOR PRODUCTION THEREOF, AND MOUNTING BODY AND PROCESS FOR PRODUCTION THEREOF

FIELD OF THE INVENTION

The present invention relates to an anisotropic conductive material in which conductive particles are dispersed and a process for production thereof, and a mounting body and a process for production thereof. The present application asserts priority rights based on JP Patent Application 2010-140502 filed in Japan on Jun. 21, 2010. The total contents of disclosure of the Patent Application of the senior filing date are to be incorporated by reference into the present Application.

BACKGROUND OF THE INVENTION

In recent years, radical curing anisotropic conductive films (ACF) have been used and promoted to be bonded in a short time. However, in the radical curing ACF bonding, a process margin of temperature, pressure, fall velocity of heat tools, or the like at the time of bonding is small, whereby inconveniences have frequently occurred, for example, binder resin cures before being pushed aside.

Moreover, radical curing ACF generally has high cure shrinkage and high internal stress, and accordingly tends to have low adhesion strength. Therefore, a rubber component, such as acrylic rubber, is made to be contained in a radical curing ACF, whereby the internal stress thereof is made low and the adhesion strength thereof is made high. (For example, refer to PTL 1 and PTL 2). However, when an ACF contains a rubber component, the melt viscosity of the ACF is higher, whereby a process margin is still smaller, and high connection reliability cannot be achieved.

PRIOR-ART DOCUMENTS

Patent Document

PTL 1: Japanese Patent Application Laid-Open No. 2002-203427
PTL 2: Japanese Patent Application Laid-Open No. 2008-111092

SUMMARY OF THE INVENTION

The present invention is proposed in view of such actual circumstances, and its object is to provide an anisotropic conductive material capable of improving a process margin and achieving high connection reliability and a process for production thereof, and a mounting body and a process for production thereof.

The present inventors earnestly studied and consequently found that a process margin was improved by mixing an ethylene vinyl acetate copolymer having a predetermined melt flow rate with a radical adhesive composite.

That is to say, an anisotropic conductive material according to the present invention comprises an adhesive composite and conductive particles dispersed in the adhesive composite, the adhesive composite containing a film forming resin, an ethylene vinyl acetate copolymer, a radical polymerizable resin, and a radical polymerization initiator, wherein a melt flow rate of the ethylene vinyl acetate copolymer is not less than 400 g/10 min.

A process for production of an anisotropic conductive material according to the present invention comprises the step of dispersing conductive particles in an adhesive composite containing a film forming resin, an ethylene vinyl acetate copolymer having a melt flow rate of not less than 400 g/10 min, a radical polymerizable resin, and a radical polymerization initiator.

A mounting body according to the present invention comprises an adhesive composite containing a film forming resin, an ethylene vinyl acetate copolymer having a melt flow rate of not less than 400 g/10 min, a radical polymerizable resin, and a radical polymerization initiator; conductive particles dispersed in the adhesive composite; an insulating substrate; and an electronic component, wherein an electrode of the insulating substrate and an electrode of the electronic component are connected via the conductive particles.

A process for production of a mounting body according to the present invention comprises the steps of disposing an anisotropic conductive material and an electronic component are in order on an electrode of an insulating substrate, the anisotropic conductive material including an adhesive composite and conductive particles dispersed in the adhesive composite, the adhesive composite containing a film forming resin, an ethylene vinyl acetate copolymer having a melt flow rate of not less than 400 g/10 min, a radical polymerizable resin, and a radical polymerization initiator; pressing the electronic component from the top surface thereof by a thermocompression-bonding head; and connecting an electrode of the insulating substrate and an electrode of the electronic component via the conductive particles while curing the anisotropic conductive material.

Here, the melt flow rate (MFR) is one which is measured by approximately the same test method as that shown in Condition D of JIS-K7210 (a test temperature of 190° C., a load of 2.16 kg).

Effects of Invention

According to the present invention, the ethylene vinyl acetate copolymer improves a process margin, and high connection reliability can be obtained.

DETAILED DESCRIPTION OF THE INVENTION

Hereinafter, an embodiment of the present invention will be described in detail in the following order, with reference to the drawings.
1. Anisotropic Conductive Material and Process for Production Thereof
2. Mounting Body and Process for Production Thereof
3. Examples

1. Anisotropic Conductive Material and Process for Production Thereof

An anisotropic conductive material shown as an example of the present invention is constituted such that conductive particles are dispersed in a radical adhesive composite. The anisotropic conductive material is in a form of paste or film, and can be suitably selected according to a purpose.

The radical adhesive composite contains a film forming resin, an ethylene vinyl acetate copolymer (EVA), a radical polymerizable resin, and a radical polymerization initiator.

The film forming resin is equivalent to a high-molecular weight resin having an average molecular weight of not less than 10000, and, from a viewpoint of film forming property, preferably has an average molecular weight of approximately 10000 to 80000. Examples of the film forming resin include various kinds of resins, such as polyester urethane resin, polyester resin, polyurethane resin, phenoxy resin, acrylate resin, polyimide resin, and butyral resin, and these may be used alone, or two or more kinds of these may be used in combination. Among these, polyester urethane resin is preferably used from viewpoints of a film formation state, connection reliability, and the like. A content of the film forming resin is usually 30 to 80 parts by mass, preferably 40 to 70 parts by mass with respect to 100 parts by mass of the radical adhesive composite.

The ethylene vinyl acetate copolymer (EVA) is a thermoplastic resin obtained by copolymerizing ethylene and vinyl acetate, and a content thereof is usually 1 to 30 parts by mass, preferably 5 to 20 parts by mass with respect to 100 parts by mass of the radical adhesive composite.

As a content of vinyl acetate (VA) in the EVA increases, crystallinity of the EVA falls and plasticity thereof increases. A melt flow rate (MFR) of the EVA (JIS K7210: Condition. D) is preferably not less than 400 g/10 min. When the MFR is not less than 400 g/10 min, melt flowability at the time of bonding is excellent. Thus, an electronic component on an insulating substrate can be sufficiently pressed in, and the conductive particles can be sufficiently deformed, whereby connection resistance can be reduced and adhesion strength can be improved. Moreover, since the electronic component on the insulating substrate can be sufficiently pressed in, even under bonding conditions of low-pressure/low-speed, connection resistance and adhesion strength which are equivalent to those under an usual bonding condition can be obtained, and thus a process margin can be improved.

A VA content in the EVA (JIS K7192) is preferably not less than 10 wt %, more preferably not less than 25 wt %. By increasing the VA content, a property similar to that of rubber is obtained, and accordingly internal stress can be reduced and adhesion strength can be improved.

Such EVA can be obtained by the following synthesis. For example, using an autoclave type reactor, ethylene and a vinyl acetate monomer are mixed at a predetermined mixing mass ratio and supplied, and, under a predetermined reaction condition, an initiator is supplied to perform polymerization. Then, a solid content is dissolved and precipitated, and a precipitate is recovered/dried, whereby the EVA having a predetermined MFR and a predetermined VA can be obtained. As a commercial product, "EV410" or "EV205W" manufactured by DUPONT-MITSUI POLYCHEMICALS CO., LTD, "Ultrathene 735" manufactured by TOSOH CORP., or the like can be suitably used depending on a desired MFR and a desired VA.

The radical polymerizable resin is a substance having a functional group which polymerizes by a radical, and examples of the radical polymerizable resin include epoxy acrylate, urethane acrylate, and polyester acrylate, and these may be used alone, or two or more kinds of these may be used in combination. Among these, epoxy acrylate is preferably used in the present embodiment. A content of the radical polymerizable resin is usually 10 to 60 parts by mass, preferably 20 to 50 parts by mass with respect to 100 parts by mass of the radical adhesive composite.

As the radical polymerization initiator, a well-known initiator can be used, and in particular, an organic peroxide is preferably used. Examples of the organic peroxide include peroxyketals, diacyl peroxides, peroxydicarbonates, peroxyesters, dialkyl peroxides, hydroperoxides, and silyl peroxides, and these may be used alone, or two or more kinds of these may be used in combination. Among these, peroxyketals are preferably used in the present embodiment. A content of the radical polymerization initiator is usually 0.1 to 30 parts by mass, preferably 1 to 20 parts by mass with respect to 100 parts by mass of the radical adhesive composite.

The radical adhesive composite preferably further contains a silane coupling agent, a phosphate (meth)acrylate, and the like in order to improve adhesion to an inorganic base material.

Examples of the silane coupling agent include a methacryloxy-, an epoxy-, an amino-, a vinyl-, a mercaptosulfide-, and an ureido-silane coupling agent, and these may be used alone, or two or more kinds of these may be used in combination. Among these, a methacryloxy-silane coupling agent is preferably used in the present embodiment.

As the phosphate (meth)acrylate, monoester, diester, triester, or the like, each of which being an (meth)acrylate having a phosphate ester skeleton, can be used. Examples of the phosphate (meth)acrylate include ethylene oxide modified phenoxy phosphate (meth)acrylate, ethylene oxide modified butoxy phosphate (meth)acrylate, ethylene oxide modified octyloxy phosphate (meth)acrylate, ethylene oxide modified phosphate di(meth)acrylate, and ethylene oxide modified phosphate tri(meth)acrylate, and these may be used alone, or two or more kinds of these may be used in combination.

Furthermore, as another composite to be added, an inorganic filler is preferably contained. Examples of the inorganic filler include silica, talc, titanium oxide, calcium carbonate, magnesium oxide. Using a content of the inorganic filler, flowability is controlled and a particle capture rate is improved.

As an organic solvent to dissolve these, toluene, ethyl acetate, a mixed solvent obtained by mixing toluene with ethyl acetate, and other various organic solvents can be used.

As the conductive particles to be dispersed in the radical adhesive composite, for example, metal particles, such as nickel, gold, and copper, and particles obtained by plating resin particles with gold can be used. From a viewpoint of connection reliability, an average particle diameter of the conductive particles is preferably 1 to 20 μm, more preferably 2 to 10 μm. Also, from viewpoints of connection reliability and insulation reliability, an average particle density of the conductive particles in the radical adhesive composite is preferably 1000 to 50000 particles/mm$^2$, more preferably 5000 to 30000 particles/mm$^2$.

In the case of obtaining an anisotropic conductive material having a form of film, the anisotropic conductive composite adjusted as mentioned above is made to have a film form, whereby an anisotropic conductive film is obtained. Hereinafter, a process for production of the anisotropic conductive film will be explained.

A process for production of the anisotropic conductive film according to the present embodiment comprises the step of dispersing conductive particles in an adhesive composite containing a film forming resin, an ethylene vinyl acetate copolymer having a melt flow rate of not less than 400 g/10 min, a radical polymerizable resin, and a radical polymerization initiator.

Specifically, first, the anisotropic conductive material is adjusted, and then applied on a release base material by using a bar coater, a coating applicator, or the like. The release base material, for example, includes a lamination structure obtained by applying a release agent, such as silicone, on PET (Poly Ethylene Terephthalate), OPP (Oriented Polypropylene), PMP (Poly-4-methlpentene-1), PTFE (Polytetrafluoroethylene), or the like, and prevents resin in the anisotropic conductive material from being dried, as well as maintains the form of the resin.

Next, the anisotropic conductive material applied on the release base material is dried using a heat oven, a heat-drying apparatus, or the like. Thus, an anisotropic conductive film having a thickness of approximately 5 to 50 μm is produced.

2. Mounting Body and Process for Production Thereof

Next, a mounting process of an electronic component by using the anisotropic conductive film will be explained. The mounting process of an electronic component in the present embodiment comprises the steps of disposing an anisotropic conductive film and an electronic component in order on an electrode of an insulating substrate, the anisotropic conductive film including an adhesive composite and conductive particles dispersed in the adhesive composite, the adhesive composite containing a film forming resin, an ethylene vinyl acetate copolymer having a melt flow rate of not less than 400 g/10 min, a radical polymerizable resin, and a radical polymerization initiator; pressing the electronic component from the top surface thereof by a thermocompression-bonding head; and connecting the electrode of the insulating substrate and an electrode of the electronic component via the conductive particles while curing the anisotropic conductive film. Thus, there is obtained a mounting body in which the electrode of the insulating substrate and the electrode of the electronic component are connected via the conductive particles dispersed in the adhesive composite.

In the present embodiment, since the anisotropic conductive film contains the ethylene vinyl acetate copolymer having a melt flow rate of not less than 400 g/10 min, a bonding condition at the time of pressing by a thermocompression-bonding head can be set to a temperature of 120 to 220 degrees C., a pressure of 1 to 10 MPa, a connection time of 1 to 10 sec, and a tool fall velocity of 0.5 to 20 mm/sec, and accordingly the bonding can be performed with a large process margin. Specifically, for example, even under low-pressure/low-speed compression bonding conditions of 190 degrees C., 2 MPa, 5 sec, and a fall velocity of heat tool of 1 mm/sec, there can be obtained connection resistance and adhesion strength which are equivalent to those under usual bonding conditions of 190 degrees C., 4 MPa, 5 sec, and a heat tool fall velocity of 10 mm/sec.

EXAMPLES

3. Examples

Hereinafter, Examples of the present invention will be described. Here, first, anisotropic conductive films for Comparative Examples 1 to 4 and Examples 1 to 9 were produced, and then a first mounting body and a second mounting body, each having a corresponding different bonding condition, were completed using the anisotropic conductive films. Then, connection resistance and adhesion strength of the first mounting body and the second mounting body were measured. Note that the present invention is not limited to these Examples.

Ethylene vinyl acetate copolymers (EVA) were synthesized as follows. Using a 6-liter autoclave-type reactor, ethylene and a vinyl acetate monomer were mixed at a predetermined mixing mass ratio and supplied at a flow rate of 150 to 200 kg/hr, and, under conditions of a reaction pressure of 160 MPa and a production rate of 20 kg/hr, 100 g/hr of peroxide was supplied as an initiator to perform polymerization of EVA. Subsequently, a solid content was dissolved in hot hexane and precipitated into 2-propanol (IPA), and the precipitate was recovered/dried, whereby EVA1 to EVA9 each having a predetermined MFR and a predetermined VA were obtained.

Comparative Example 1

Conductive particles (product name: AUL704, manufactured by Sekisui Chemical Co., Ltd.) were dispersed so that an average particle density thereof was 10000 particles/mm$^2$ with respect to 100 parts by mass of an adhesive composite which was constituted by 60 parts by mass in solid content conversion of a polyester urethane resin (product name: URS200, manufactured by Toyobo Co., Ltd., dissolved with a mixed solvent of methyl-ethyl-ketone:toluene=50:50 so as to be 20 mass %) as a film forming material, 34 parts by mass of a radical polymerizable resin (product name: EB-600, manufactured by DAICEL-CYTEC Company Ltd.), 1 part by mass of a silane coupling agent (product name: KBM-503, manufactured by Shin-Etsu Chemical Co., Ltd.), 1 part by mass of a phosphate acrylate (product name: P-1M, manufactured by Kyoeisha Chemical Co., Ltd.), and 4 parts by mass of a radical polymerization initiator (product name: PERHEXA C, manufactured by NOF Corporation). The anisotropic conductive connection material thus obtained was applied on a PET film by using a bar coater, and dried by an oven, whereby a 15-μm thick anisotropic conductive film of Comparative Example 1 was produced.

Comparative Example 2

An anisotropic conductive film of Comparative Example 2 was produced in the same manner as in Comparative Example 1, except that 50 parts by mass in solid content conversion of a polyester urethane resin (product name: UR8200, manufactured by Toyobo Co., Ltd., dissolved with a mixed solvent of methyl-ethyl-ketone:toluene=50:50 so as to be 20 mass %) was used as a film forming material, and 10 parts by mass of acrylic rubber (product name: SG-600LB, manufactured by Nagase ChemteX Corporation) was used as a stress relaxation component.

Comparative Example 3

An anisotropic conductive film of Comparative Example 3 was produced in the same manner as in Comparative Example 1, except that 50 parts by mass in solid content conversion of a polyester urethane resin (product name: UR8200, manufactured by Toyobo Co., Ltd., dissolved with a mixed solvent of methyl-ethyl-ketone:toluene=50:50 so as to be 20 mass %) was used as a film forming material, and 10 parts by mass of EVA1 obtained by the synthesis and having MFR=150 and VA=19% was used.

Comparative Example 4

An anisotropic conductive film of Comparative Example 4 was produced in the same manner as in Comparative Example 3, except that 10 parts by mass of EVA2 obtained by the synthesis and having MFR=150 and VA=28% was used.

Example 1

An anisotropic conductive film of Example 1 was produced in the same manner as in Comparative Example 3, except that 10 parts by mass of EVA3 obtained by the synthesis and having MFR=400 and VA=19% was used.

Example 2

An anisotropic conductive film of Example 2 was produced in the same manner as in Comparative Example 3, except that 10 parts by mass of EVA4 obtained by the synthesis and having MFR=800 and VA=19% was used.

Example 3

An anisotropic conductive film of Example 3 was produced in the same manner as in Comparative Example 3, except that 10 parts by mass of EVA5 obtained by the synthesis and having MFR=400 and VA=25% was used.

Example 4

An anisotropic conductive film of Example 4 was produced in the same manner as in Comparative Example 3, except that 10 parts by mass of EVA6 obtained by synthesis and having MFR=400 and VA=28% was used.

Example 5

An anisotropic conductive film of Example 5 was produced in the same manner as in Comparative Example 3, except that 10 parts by mass of EVA7 obtained by the synthesis and having MFR=400 and VA=33% was used.

Example 6

An anisotropic conductive film of Example 6 was produced in the same manner as in Comparative Example 3, except that 10 parts by mass of EVA8 obtained by the synthesis and having MFR=800 and VA=28% was used.

Example 7

An anisotropic conductive film of Example 7 was produced in the same manner as in Comparative Example 3, except that 10 parts by mass of EVA9 obtained by the synthesis and having MFR=1000 and VA=28% was used.

Example 8

An anisotropic conductive film of Example 8 was produced in the same manner as in Comparative Example 3, except that 57 parts by mass in solid content conversion of a polyester urethane resin (product name: UR8200, manufactured by Toyobo Co., Ltd., dissolved with a mixed solvent of methyl-ethyl-ketone:toluene=50:50 so as to be 20 mass %) and 3 parts by mass of EVA5 obtained by the synthesis and having MFR=400 and VA=25% were used.

Example 9

An anisotropic conductive film of Example 9 was produced in the same manner as in Comparative Example 3, except that 55 parts by mass in solid content conversion of a polyester urethane resin (product name: UR8200, manufactured by Toyobo Co., Ltd., dissolved with a mixed solvent of methyl-ethyl-ketone:toluene=50:50 so as to be 20 mass %) and 5 parts by mass of EVA5 obtained by the synthesis and having MFR=400 and VA=25% were used.

Table 1 shows the examples of formulation of Comparative Examples 1 to 4 and Examples 1 to 9.

TABLE 1

| | MFR (g/10 min) | VA (wt %) | Comparative Example | | | | Example | | | | | | | | |
|---|---|---|---|---|---|---|---|---|---|---|---|---|---|---|---|
| | | | 1 | 2 | 3 | 4 | 1 | 2 | 3 | 4 | 5 | 6 | 7 | 8 | 9 |
| UR-8200 | — | — | 60 | 50 | 50 | 50 | 50 | 50 | 50 | 50 | 50 | 50 | 50 | 57 | 55 |
| EB-800 | — | — | 34 | 34 | 34 | 34 | 34 | 34 | 34 | 34 | 34 | 34 | 34 | 34 | 34 |
| P-1M | — | — | 1 | 1 | 1 | 1 | 1 | 1 | 1 | 1 | 1 | 1 | 1 | 1 | 1 |
| KBM-503 | — | — | 1 | 1 | 1 | 1 | 1 | 1 | 1 | 1 | 1 | 1 | 1 | 1 | 1 |
| PERHEXA C | — | — | 4 | 4 | 4 | 4 | 4 | 4 | 4 | 4 | 4 | 4 | 4 | 4 | 4 |
| SG-600LB | — | — | 10 | | | | | | | | | | | | |
| EVA1 | 150 | 19 | | 10 | | | | | | | | | | | |
| EVA2 | 150 | 28 | | | 10 | | | | | | | | | | |
| EVA3 | 400 | 19 | | | | | 10 | | | | | | | | |
| EVA4 | 800 | 19 | | | | | | 10 | | | | | | | |
| EVA5 | 400 | 25 | | | | | | | 10 | | | | | 3 | 5 |
| EVA6 | 400 | 28 | | | | | | | | 10 | | | | | |
| EVA7 | 400 | 33 | | | | | | | | | 10 | | | | |
| EVA8 | 800 | 28 | | | | | | | | | | 10 | | | |
| EVA9 | 1000 | 28 | | | | | | | | | | | 10 | | |

Formulation unit: parts by mass

<Evaluation>

Using Comparative Examples 1 to 4 and Examples 1 to 9, a COF (50 μm-pitched, Cu(8 μm-thick)-Sn plated, 38 μm-thick, product name: Sperflex, manufactured by Sumitomo Metal Mining Co., Ltd.) obtained by COF (Chip On Film) bonding and an IZO (Indium Zinc Oxide) coating glass (IZO-coated on the entire surface, a glass thickness of 0.7 mm) were bonded.

Each of the anisotropic conductive films of Comparative Examples 1 to 4 and Examples 1 to 9 was slit to have a width of 1.5 mm width, and stuck on the IZO coating glass. After temporarily fixing the COF thereon, using a 100 μm-thick Teflon (trademark) as a buffer material, bonding was performed with a heat tool having a width of 1.5 mm, under bonding conditions of 190 degrees C., 2 MPa, 5 sec, and 1 mm/sec fall velocity of the heat tool, whereby a first mounting body was completed.

Furthermore, bonding was performed under bonding conditions of 190 degrees C., 4 MPa, 5 sec, and 10 mm/sec fall velocity of the heat tool, whereby a second mounting body was completed.

Connection resistance and adhesion strength of the first mounting body and the second mounting body thus obtained were measured and evaluated. Table 2 shows evaluation results. Note that the connection resistance and the adhesion strength were measured as follows.

[Connection Resistance]

For the first mounting body and the second mounting body, initial resistance and resistance after a thermal humidity test (TH test) at a temperature of 85 degrees C. and a relative humidity of 85% for 500 hours were measured. Using a digital multimeter (Digital Multimeter 7555, manufactured by Yokogawa Electric Corporation), the connection resistance when a 1 mA current was applied was measured by a 4-terminal method.

[Adhesion Strength]

For the first mounting body and the second mounting body, initial adhesion strength and adhesion strength after a thermal humidity test (TH test) at a temperature of 85 degrees C. and a relative humidity of 85% for 500 hours were measured. Using a tensile tester (product number: RTC 1201, manufactured by AND), the adhesion strength was measured by pulling up the COF at a speed of 50 mm/sec.

Furthermore, in Examples 1 and 2 in each of which a content of vinyl acetate (VA) in the EVA was less than 25 wt %, the result was that both of the first mounting body and the second mounting body did not have adhesion strength after the TH test of not less than 6.0 N/cm, while, in Examples 3 to 7 in each of which a content of VA in the EVA was not less than 25 wt %, the result was that both of the first mounting body and the second mounting body had adhesion strength after the TH test of not less than 6.0 N/cm.

The invention claimed is:

1. An anisotropic conductive material, comprising an adhesive composite and conductive particles dispersed in the adhesive composite, the adhesive composite containing a film forming resin, an ethylene vinyl acetate copolymer, a radical polymerizable resin, and a radical polymerization initiator,
   wherein a melt flow rate of the ethylene vinyl acetate copolymer according to Condition D of JIS-K7210 is not less than 400 g/10 min.

2. The anisotropic conductive material according to claim 1, wherein a content of vinyl acetate in the ethylene vinyl acetate copolymer is not less than 25 wt %.

3. The anisotropic conductive material according to claim 1, wherein the film forming resin is at least one selected from the group consisting of a polyester urethane resin, a polyester resin, a polyurethane resin, a phenoxy resin, an acrylate resin, a polyimide resin, and a butyral resin.

TABLE 2

| | | Comparative Example | | | | Example | | | | | | | | |
|---|---|---|---|---|---|---|---|---|---|---|---|---|---|---|
| | | 1 | 2 | 3 | 4 | 1 | 2 | 3 | 4 | 5 | 6 | 7 | 8 | 9 |
| First Mounting Body (Bonding Conditions: 190 degrees C., 2 MPa, 5 sec, and 1 mm/sec fall velocity of a heat tool) | | | | | | | | | | | | | | |
| Connection Resistance (Ω) | Initial | 3.5 | 7.9 | 3.0 | 3.0 | 2.3 | 1.9 | 2.2 | 2.0 | 2.2 | 1.9 | 2.0 | 3.1 | 2.9 |
| | 85° C./85% RH | 5.3 | 20.5 | 5.1 | 5.5 | 3.2 | 2.9 | 3.2 | 3.3 | 3.2 | 2.7 | 2.5 | 5.0 | 4.8 |
| Adhesion Strength (N/cm) | Initial | 3.0 | 7.7 | 4.5 | 7.5 | 4.3 | 4.5 | 7.1 | 7.3 | 7.7 | 7.8 | 7.0 | 3.7 | 4.8 |
| | 85° C./85% RH | 1.1 | 6.5 | 2.9 | 6.2 | 3.0 | 3.0 | 6.0 | 6.1 | 6.7 | 6.6 | 6.0 | 3.0 | 3.6 |
| Second Mounting Body (Bonding Conditions: 190 degrees C., 4 MPa, 5 sec, and 10 mm/sec fall velocity of a heat tool) | | | | | | | | | | | | | | |
| Connection Resistance (Ω) | Initial | 2.5 | 3.4 | 2.5 | 2.6 | 1.8 | 1.9 | 2.0 | 1.8 | 2.0 | 1.9 | 1.7 | 2.6 | 2.5 |
| | 85° C./85% RH | 4.4 | 9.9 | 4.6 | 4.8 | 3.0 | 2.9 | 2.9 | 3.0 | 3.1 | 3.0 | 2.8 | 4.5 | 4.4 |
| Adhesion Strength (N/cm) | Initial | 3.0 | 4.5 | 4.5 | 7.3 | 4.9 | 4.6 | 7.2 | 7.0 | 7.5 | 7.2 | 7.0 | 3.6 | 4.5 |
| | 85° C./85% RH | 1.1 | 6.5 | 2.8 | 6.0 | 4.0 | 3.3 | 6.3 | 6.1 | 6.3 | 6.2 | 6.0 | 3.0 | 3.4 |

As shown in Table 2, in Examples 1 to 9 in each of which the ethylene vinyl acetate copolymer (EVA) had a melt flow rate of not less than 400 g/10 min, the result was that both of the first mounting body and the second mounting body had connection resistance after the TH test of not more than 5.0Ω and adhesion strength after the TH test of not less than 3.0 N/cm. In other words, it was found that each of Examples 1 to 9 in which the EVA had a melt flow rate of not less than 400 g/10 min had a large process margin.

On the other hand, in Comparative Examples 1 to 4 in each of which an ethylene vinyl acetate copolymer (EVA) was not included or had a melt flow rate of less than 400 g/10 min, the result was that both of the first mounting body and the second mounting body did not have connection resistance after the TH test of not more than 5.0Ω and adhesion strength after the TH test of not less than 3.0 N/cm.

4. The anisotropic conductive material according to claim 1, wherein the radical polymerizable resin is at least one selected from the group consisting of epoxy acrylate, urethane acrylate, and polyester acrylate.

5. The anisotropic conductive material according to claim 1, wherein the radical polymerization initiator is at least one selected from the group consisting of peroxyketal, diacyl peroxide, peroxydicarbonate, peroxyester, dialkyl peroxide, hydroperoxide, and silyl peroxide.

6. The anisotropic conductive material according to claim 1, having a film form.

7. A process for production of an anisotropic conductive material, comprising the step of dispersing conductive particles in an adhesive composite containing a film forming resin, an ethylene vinyl acetate copolymer having a melt flow rate of not less than 400 g/10 min according to Condition of JIS-K7210, a radical polymerizable resin, and a radical polymerization initiator.

8. A mounting body, comprising:
an adhesive composite containing a film forming resin, an ethylene vinyl acetate copolymer having a melt flow rate of not less than 400 g/10 min according to Condition D of JIS-K7210, a radical polymerizable resin, and a radical polymerization initiator;
conductive particles dispersed in the adhesive composite;
an insulating substrate; and
an electronic component,
wherein an electrode of the insulating substrate and an electrode of the electronic component are connected via the conductive particles.

9. A process for production of a mounting body, comprising the steps of:

disposing an anisotropic conductive material and an electronic component in order on an electrode of an insulating substrate,
the anisotropic conductive material including an adhesive composite and conductive particles dispersed in the adhesive composite,
the adhesive composite containing a film forming resin, an ethylene vinyl acetate copolymer having a melt flow rate of not less than 400 g/10 min according to Condition D of JIS-K7210, a radical polymerizable resin, and a radical polymerization initiator;
pressing the electronic component from a top surface thereof by a thermocompression-bonding head; and
connecting an electrode of the insulating substrate and an electrode of the electronic component via the conductive particles while curing the anisotropic conductive material.

* * * * *